United States Patent
Zhang et al.

(10) Patent No.: US 12,407,759 B2
(45) Date of Patent: Sep. 2, 2025

(54) INDICATING READY STATUSES FOR NETWORK CONNECTIONS TO REMOTE SERVICES

(71) Applicant: INTERNATIONAL BUSINESS MACHINES CORPORATION, Armonk, NY (US)

(72) Inventors: Guanqin Zhang, Beijing (CN); Lei Ren, Beijing (CN); Ying Mo, Beijing (CN); Gui Ying Jin, Beijing (CN); Hui Guang Liu, Beijing (CN); Yue Chen, Beijing (CN); Yue Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 18/404,147

(22) Filed: Jan. 4, 2024

(65) Prior Publication Data
US 2025/0227153 A1    Jul. 10, 2025

(51) Int. Cl.
G06F 15/16     (2006.01)
H04L 43/0811   (2022.01)
H04L 67/141    (2022.01)

(52) U.S. Cl.
CPC ........ *H04L 67/141* (2013.01); *H04L 43/0811* (2013.01)

(58) Field of Classification Search
CPC ............................ H04L 67/141; H04L 43/0811
See application file for complete search history.

(56) References Cited

U.S. PATENT DOCUMENTS

| | | | |
|---|---|---|---|
| 10,892,989 B2 | 1/2021 | Jain | |
| 11,150,963 B2 | 10/2021 | Nainar | |
| 11,627,056 B2 | 4/2023 | Abdollahi Vayghan | |
| 2014/0181572 A1* | 6/2014 | Bradfield | G06F 11/261 714/4.11 |
| 2017/0318081 A1* | 11/2017 | Hopen | H04L 67/1017 |
| 2018/0375825 A1* | 12/2018 | Nataraja | H04L 61/256 |

(Continued)

FOREIGN PATENT DOCUMENTS

CN          110321115 B     12/2022

OTHER PUBLICATIONS

"Introduction—Inlets," https://docs.inlets.dev/, printed from the Internet Dec. 29, 2023, 6 pages.

(Continued)

*Primary Examiner* — Razu A Miah
(74) *Attorney, Agent, or Firm* — Eric W. Chesley

(57) ABSTRACT

Described are techniques for providing a ready status for network connections to remote services. The techniques include monitoring network connectivity between a server and a plurality of remote services, where the server exposes the plurality of remote services to at least one application, and the server and the at least one application are hosted on a cluster of nodes managed by a container orchestration system. The techniques further include assigning to the server, based on the network connectivity between the server and the remote service, a ready status for each remote service in the plurality of remote services exposed by the server to the at least one application, where the ready status indicates a readiness of the server to provide network connections between the remote service and the at least one application.

20 Claims, 6 Drawing Sheets

(56) References Cited

U.S. PATENT DOCUMENTS

| | | | | |
|---|---|---|---|---|
| 2020/0186422 | A1* | 6/2020 | Fildebrandt | G06F 9/505 |
| 2020/0278892 | A1* | 9/2020 | Nainar | H04L 67/10 |
| 2021/0019194 | A1* | 1/2021 | Bahl | H04L 67/1031 |
| 2021/0144517 | A1* | 5/2021 | Guim Bernat | H04L 47/781 |
| 2021/0328886 | A1* | 10/2021 | Guim Bernat | G06F 9/5072 |
| 2023/0208704 | A1 | 6/2023 | Singhal | |

OTHER PUBLICATIONS

"Labels and Selectors," https://kubernetes.io/docs/concepts/overview/working-with-objects/labels/, printed from the Internet Oct. 3, 2023, 7 pages.

"Multicloud communication for Kubernetes," Skupper-Multicloud communication, https://skupper.io/, printed from the Internet Dec. 29, 2023, 2 pages.

"Secure Tunnel scenarios and solutions," https://www.IBM.com/docs/en/cloud-paks/cp-management/2.3.x?topic=network-secure-tunnel-scenarios-solutions, printed from the Internet Oct. 3, 2023, 5 pages.

"The Axonius Platform," https://docs.axonius.com/docs/the-axonius-platform, printed from the internet Dec. 29, 2023, 2 pages.

Balkan, Ahmet Alp, "Advanced Health Check Patterns in Kubernetes," https://ahmet.im/blog/advanced-kubernetes-health-checks/, printed from the Internet Oct. 3, 2023, 4 pages.

Menachem, Guy, "Kubernetes Health Checks: Everything You Need to Know," https://komodor.com/blog/kubernetes-health-checks-everything-you-need-to-know/#:~:text=In%20Kubernetes%2C%20you%20use%20probes,the%20unhealthy%20pod%20to%20recover, printed from the internet Oct. 3, 2023, 13 pages.

* cited by examiner

400

┌─────────────────────────────────────────────────────────┐
│ 402                                                  │
│ MONITOR NETWORK CONNECTIVITY BETWEEN A SERVER AND A     │
│ PLURALITY OF REMOTE SERVICES EXPOSED BY THE SERVER TO AN│
│ APPLICATION HOSTED ON A CLUSTER MANAGED BY A CONTAINER  │
│ ORCHESTRATION SYSTEM                                     │
└─────────────────────────────────────────────────────────┘
                            │
                            ▼
┌─────────────────────────────────────────────────────────┐
│ 404                                                  │
│ FOR EACH REMOTE SERVICE EXPOSED BY THE SERVER, ASSIGN A │
│ READY STATUS TO THE SERVER, BASED ON THE NETWORK         │
│ CONNECTIVITY, TO INDICATE A READINESS OF THE SERVER TO PROVIDE│
│ A NETWORK CONNECTION BETWEEN THE REMOTE SERVICE AND THE │
│ APPLICATION                                              │
└─────────────────────────────────────────────────────────┘

FIG. 4

INDICATING READY STATUSES FOR NETWORK CONNECTIONS TO REMOTE SERVICES

BACKGROUND

The present disclosure relates to container orchestration systems, and more specifically, to network services management in container orchestration systems.

Container orchestration is the automation of operational tasks needed to execute containerized applications and services. Containers are a method of building, packaging, and deploying software. In the simplest terms, a container includes both application code and the dependencies that the application code needs to run properly. The operational tasks automated by container orchestration can include container provisioning, deployment, scaling (up and down), networking, and load balancing.

SUMMARY

Aspects of the present disclosure are directed toward a system configured to monitor network connectivity between a server and a plurality of remote services, where the server exposes the plurality of remote services to at least one application, and the server and the at least one application are hosted on a cluster of nodes managed by a container orchestration system. The system being further configured to assign to the server, based on the network connectivity between the server and the remote service, a ready status for each remote service in the plurality of remote services exposed by the server to the at least one application, where the ready status indicates a readiness of the server to provide network connections between the remote service and the at least one application.

Additional aspects of the present disclosure are directed to computer-implemented methods and computer program products configured to perform the operations described above. The present summary is not intended to illustrate every aspect, implementation, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

FIG. 4 is a flow diagram illustrating an example method for determining the readiness of a server to provide network connections to remote services and assigning corresponding ready statuses to the server, in accordance with some embodiments of the present disclosure.

Figure 1:
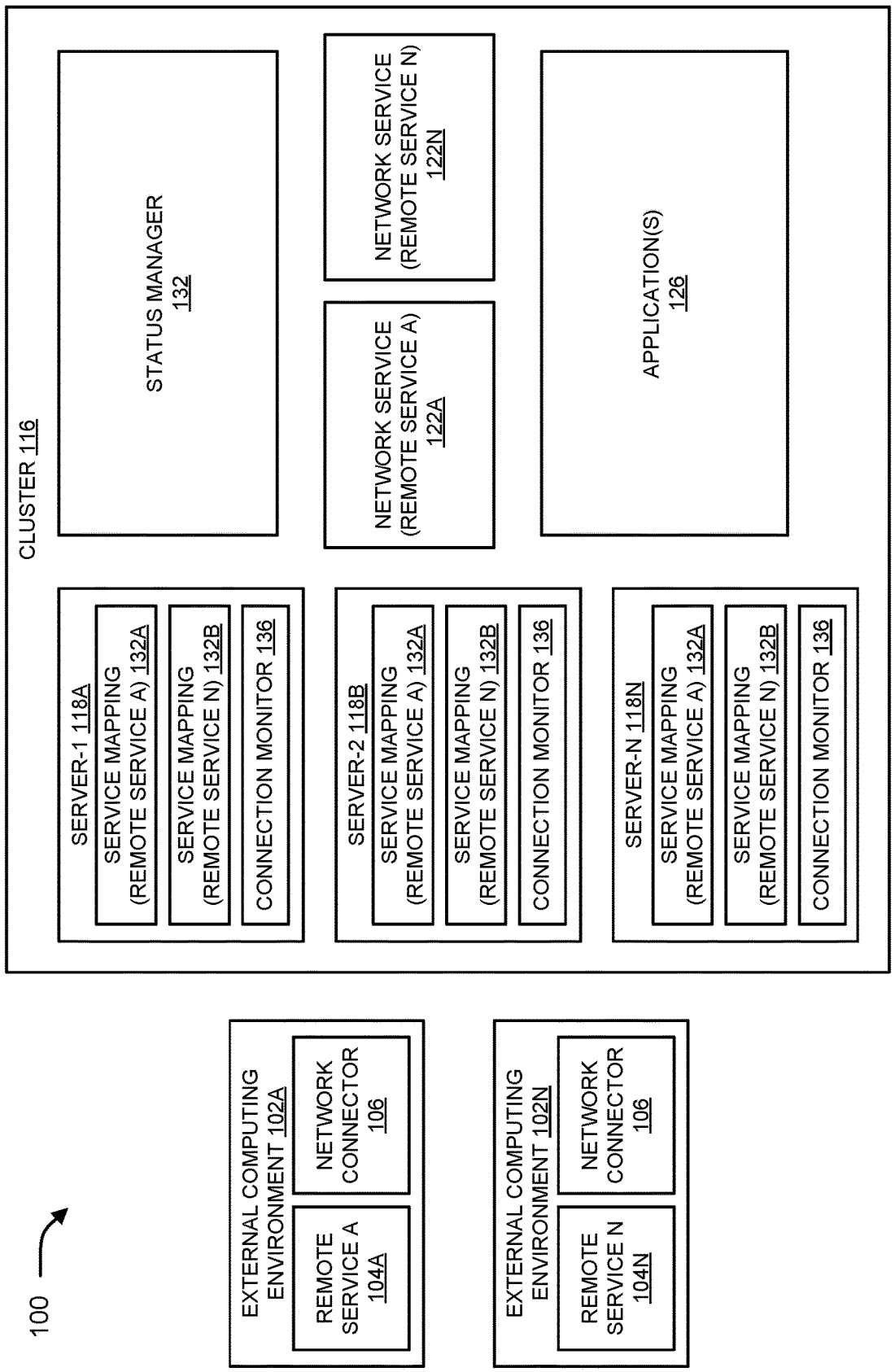
FIG. 1 is a block diagram illustrating an example computational environment that implements techniques for indicating the readiness of a server to provide network connections to remote services, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward determining the readiness of a server to provide network connections to remote services exposed by the server, and assigning ready statuses to the server to indicate the server's readiness to provide the network connections to the remote services. While not limited to such applications, embodiments of the present disclosure may be better understood in light of the aforementioned context.

Containerization is the packaging of software code with operating system (OS) libraries and dependencies needed to execute the software code, thereby creating a single lightweight executable, referred to as a containerized application. Container orchestration automates the deployment, management, scaling, and networking of containerized applications. Container orchestration systems provide the ability to expose remote services, such as databases, event-streaming services, message queues, caching servers, and artificial intelligence (AI) models to one or more applications hosted by a cluster of nodes. Container orchestration systems, such as Kubernetes®, can provide a way of abstracting access to a remote service as a network service that is callable by an application hosted on a cluster. The network service exposes the remote service to the application via one or more servers that are configured to map network connections between the remote service and the application. As referred to herein, exposing a remote service by a network service and/or a server refers to making the remote service accessible to one or more applications hosted on a cluster of nodes via a programming application interface (API), a port providing a connection endpoint using a specified protocol, or another technique that enables the remote service to be accessed.

As part of exposing a remote service to one or more applications hosted on a cluster of nodes, a server that provides network connections to a remote service can be assigned a ready status to indicate the server's readiness to provide the network connections. In a case where the ready status of the server indicates that the server is not ready to provide network connections to the remote service (e.g., the server cannot establish a secure tunnel connection to the remote service), connection requests can be routed to another server having a ready status indicating that the server is able to provide network connections to the remote service.

However, as will become clearer later when referencing the figures, in implementations where each individual server is configured to provide network connections to multiple remote services (e.g., where a server provides network connections to both a database and an event-streaming message), the ready status of the server may not accurately reflect the server's readiness to provide network connections for each of the remote services. As an example, due to a loss in connectivity to a first remote service (e.g., a database), the server may not be ready to provide a network connection to the first remote service, but may be ready to provide a network connection to a second remote service (e.g., an event-streaming service). Consequently, the ready status of the server does not accurately represent that the server cannot fulfill a connection request to the first remote service.

Advantageously, aspects of the present disclosure overcome the challenges described above (as well as other challenges) by providing a ready status for each remote service for which a server is configured to provide a network connection. More specifically, aspects of the present disclosure monitor network connectivity between the server and the remote services which the server exposes to one or more applications hosted on a cluster of nodes. Based on the monitoring of the network connectivity, aspects of the disclosure assign to the server, according to the network connectivity between the server and the remote service, a ready status for each remote service exposed by the server, where the ready status indicates a readiness of the server to provide network connections between the remote service and the application. For example, a ready status associated with a first remote service (e.g., a database) exposed by the server indicates the server's ability to provide a network connection to the first remote service, and a ready status associated with a second remote service (e.g., an event-streaming service) exposed by the server indicates the server's ability to provide a network connection to the second remote service. These aspects of the present disclosure provide improvements in the technical field of computer networking generally, and more particularly, in the technical field of monitoring network connectivity to accurately represent the ability of a server to provide network connections to remote services, which improves network reliability in container orchestration systems.

Referring now to the figures, FIG. 1 illustrates a block diagram of an example computational environment 100 that implements techniques for indicating the readiness of a server to connect to remote services, in accordance with some embodiments of the present disclosure. As illustrated, the computational environment 100 includes a cluster 116 of nodes managed by a container orchestration system that host one or more applications 126. An application 126 can be any type of application or service that can be implemented on a cluster 116 and is configured to access a remote service 104. As a non-limiting example, an application 126 can be a web application that is deployed to the cluster 116, where the web application is composed of multiple containers, including a web server, an application server, and a database, which are managed by a container orchestration system.

The one or more applications 126 are configured to access various remote services 104A, 104N (collectively 104, where N can refer to any positive integer representing any number of remote services). The remote services 104 comprise software that executes in a computing environment that is located outside of the cluster 116. The remote services 104 are accessible to the one or more applications 126 to allow the one or more applications 126 to consume the services provided by the remote services 104. Illustratively, the remote services 104 can be, but are not limited to, databases, event-streaming services, message queues, caching servers, AI models, as well as other types of remote services. As illustrated, the remote services 104 are hosted, respectively, on external computing environments 102A and 102N (collectively 102, where N can refer to any positive integer representing any number of external computing environments). An external computing environment 102 can comprise any computing environment that is located outside of the cluster 116, such as, but not limited to, an enterprise network, a private cloud, a public cloud, and other types of computing environments.

The one or more applications 126 access a remote service 104 by way of a network service 122A, 122N (collectively 122, where N can refer to any positive integer representing any number of network service) and a server 118A, 118B, 118N (collectively 118, where N can refer to any positive integer representing any number of servers) that expose the remote service 104 to the one or more applications 126. As described earlier, container orchestration systems, like Kubernetes®, can abstract access to a remote service 104 as a network service 122, which is callable by the one or more applications 126 hosted in the cluster 116. In the illustrated embodiment, a network service 122 can be provided for each remote service 104 that is exposed to the one or more applications 126 in the cluster 116. For example, as shown in FIG. 1, the cluster 116 can include a network service 122A for accessing "Remote Service A" and a network service 122N for accessing "Remote Service N". An application 126 can connect to a particular remote service 104 by calling a network service 122 that is associated with the particular remote service 104. As an illustration, an application 126 can access "Remote Service A" by calling the network service 112A that is associated with "Remote Service A", and can access "Remote Service N" by calling the network service 112N associated with "Remote Service N".

The network services 122 route connection requests received from an application 126 to one of the servers 118 included on the cluster 116. In the context of the Kubernetes® container orchestration system, the servers 118 can be implemented using instances of a pod, which comprises a group of one or more containers that work together to map a network connection between a remote service 104 and an application 126. The servers 118 provide network connections to the remote services 104, such that each individual server 118 can be configured to provide network connections for a plurality of remote services 104. As an example, a server 118 can provide network connections to a first remote service 104A "Remote Service A" and to a second remote service 104N "Remote Service N".

Connecting to a remote service 104 can comprise establishing a network connection with a network connector 106 (e.g., network interface) located in an external computing environment 102 that hosts the remote service 104 through an outgoing network (e.g., a wide area network (WAN)). As shown in FIG. 1, a server 118 can include service mappings 132A, 132B for connecting to the remote services 104. A service mapping 132A, 132B routes requests and responses between the server 118 and a network connector 106 associated with a particular remote service 104. As an illustration, a server 118 can include a first service mapping 132A that routes requests and responses between a server 118 and a network connector 106 for a first remote service 104A "Remote Service A", and a second service mapping 132B that routes requests and responses between the server 118 and a network connector 106 for a second remote service 104N "Remote Service N". In some embodiments, a secure tunnel connection can be used to access a remote service 104. In such embodiments, a server 118 is configured as a secure tunnel server, and a network connector 106 is configured as a secure tunnel connector.

As described earlier, providing a single ready status of a server 118 configured to provide network connections to a plurality of remote services 104 may not accurately reflect the server's readiness to provide the network connections for each remote service 104 exposed by the server 118. This is because a single ready status for the server 118 does not convey the situation where a first remote service 104A is not accessible to the server 118, but a second remote service 104N is accessible to the server 118. Because a single ready status cannot represent the server's ability to connect to both the first remote service 104A and the second remote service 104N, using a single ready status for the server 118 can result in failed connection requests. Accordingly, FIG. 1 illustrates a technique to accurately represent the server's ability to establish network connections for each remote service 104 for which the server 118 is configured to provide.

In the embodiment shown in FIG. 1, the servers 118 include connection monitors 136 to monitor network connectivity between the servers 118 and the remote services 104. In the context of the Kubernetes® container orchestration system, a connection monitor 136 can be implemented using a sidecar container, which comprises a separate container that executes alongside an application container in a pod. The sidecar container enhances the main container by providing additional services, features, or functionalities, which in this embodiment, comprises the monitoring of a network connection between a server 118 and a network connector 106 for a remote service 104.

Also, in the embodiment shown in FIG. 1, the cluster 116 includes a status manager 132 for assigning ready statuses (e.g., labels) to the servers 118 to indicate the servers' ability to provide network connections to the remote services 104. The status manager 132 works with the individual connection monitors 136 to determine a server's ability to access a particular remote service 104. Based on the network connectivity between the server 118 and the particular remote service 104, the status manager 132 assigns a ready status to the server 118 to indicate the server's readiness to provide network connections to the remote service 104. In the context of the Kubernetes® container orchestration system, the status manager 132 can be implemented using an operator, which comprises a software extension to the container orchestration system that uses custom resources to manage applications and their components. Although some components described above can be implemented using the Kubernetes® container orchestration system, it will be appreciated that the components can be implemented using other types of container orchestration systems.

Figure 2:
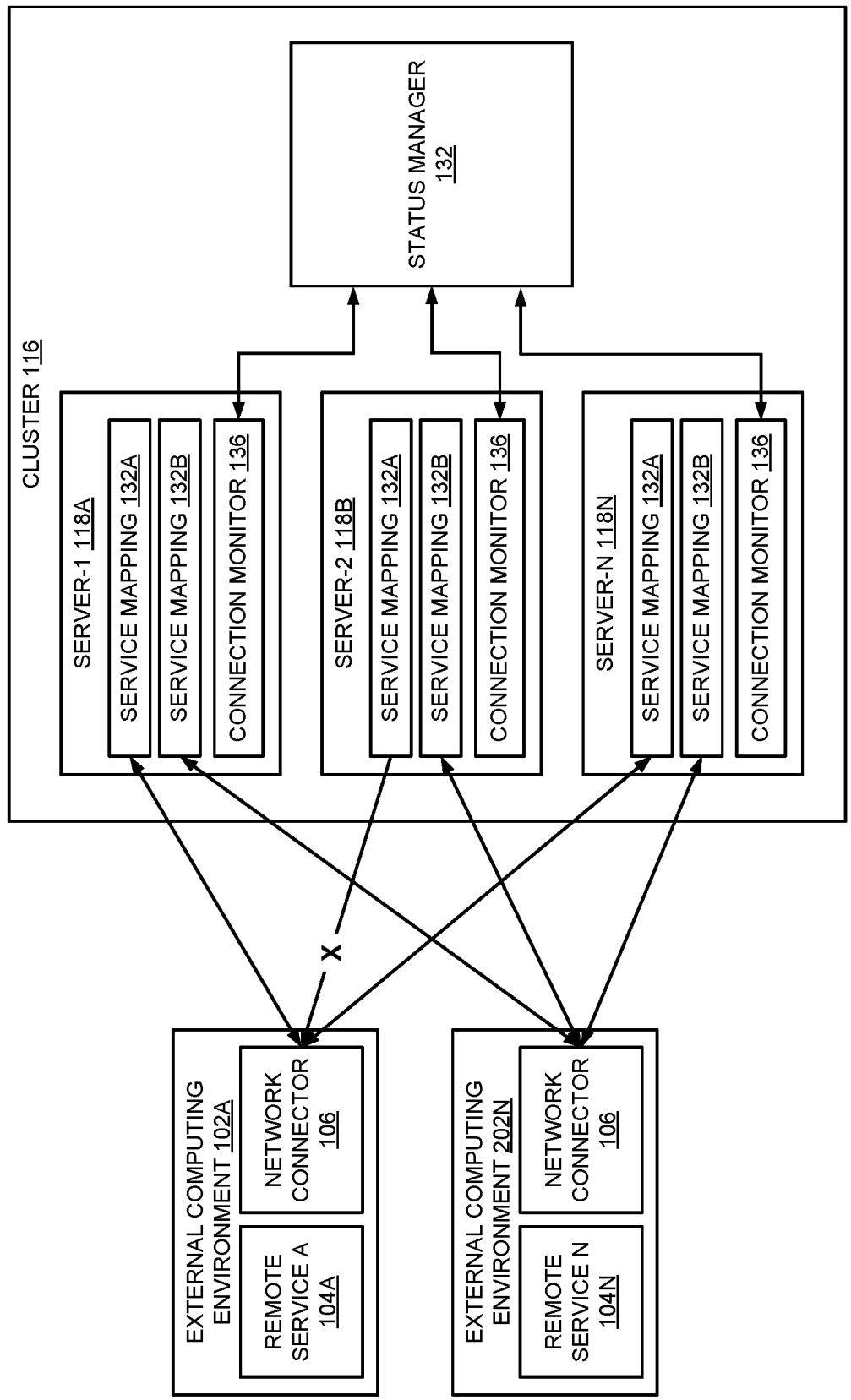
FIG. 2 is a block diagram that illustrates example interactions between system components to determine ready statuses of a server to provide network connections to remote services, in accordance with some embodiments of the present disclosure.

FIG. 2 is a block diagram illustrating interactions between the components described in association with FIG. 1, in accordance with some embodiments of the present disclosure. As illustrated, each server 118 includes an instance of a connection monitor 136 that is configured to test network connectivity between a server 118 and the remote services 104 exposed by the server 118. In some embodiments, an instance of the connection monitor 136 on a server 118 executes a script (e.g., a YAML file) that determines network connectivity between the server 118 and a particular remote service 104 exposed by the server 118. The script can comprise a sequence of instructions executed by the connection monitor 136 that determines whether the server 118 is able to access a particular remote service 104 via a network connector 106 for the remote service 104. The script can test access to a remote service 104 by calling the remote service's API, creating a transmission control protocol (TCP) socket connection to the remote service 104, determining whether a network connection file exists, as well as other techniques for determining network connectivity for the remote service 104. The connection monitor 136 can recurrently or periodically execute the script (e.g., multiple times a minute) to determine network connectivity between the server 118 and the remote service 104. Furthermore, a script can be provided for each remote service connection provided by a server 118. As an example, a server 118A can provide a network connection to a first remote service 104A "Remote Service A" and a second remote service 104N "Remote Service N".

An instance of the connection monitor 136 on a server 118 tests the network connections between the server 118 and the remote services 104 and reports the ready statuses of the server 118 to the status manager 132. As an illustrative example, the connection monitor 136 on server 118B "Server-2" tests both: a service mapping 132A between "Server-2" and remote service 104A "Remote Service A"; and a service mapping 132B between "Server-2" and remote service 104N "Remote Service N". The connection monitor 136 then reports the results of the tests (e.g., success or failure) to the status manager 132. In the case that a network connection between "Server-2" and one or more of the remote services 104 cannot be established, the connection monitor 136 reports the failure(s) to the status manager 132. For example, as illustrated in FIG. 2, the connection monitor 136 is unable to establish a network connection between "Server-2" and "Remote Service A", as illustrated by the "X" on the network connection between "Server-2" and "Remote Service A". Accordingly, the report provided by the connection monitor 136 to the status manager 132 can indicate that the status of network connectivity between "Server-2" and "Remote Service A" is "not ready", and the status of network connectivity between "Server-2" and "Remote Service N" is "ready". The status manager 132, in response to receiving the reports from the connection monitors 136, assigns ready statuses to the individual servers 118 to indicate the individual servers' ability to provide network connections to the remote services 104.

Figure 3:
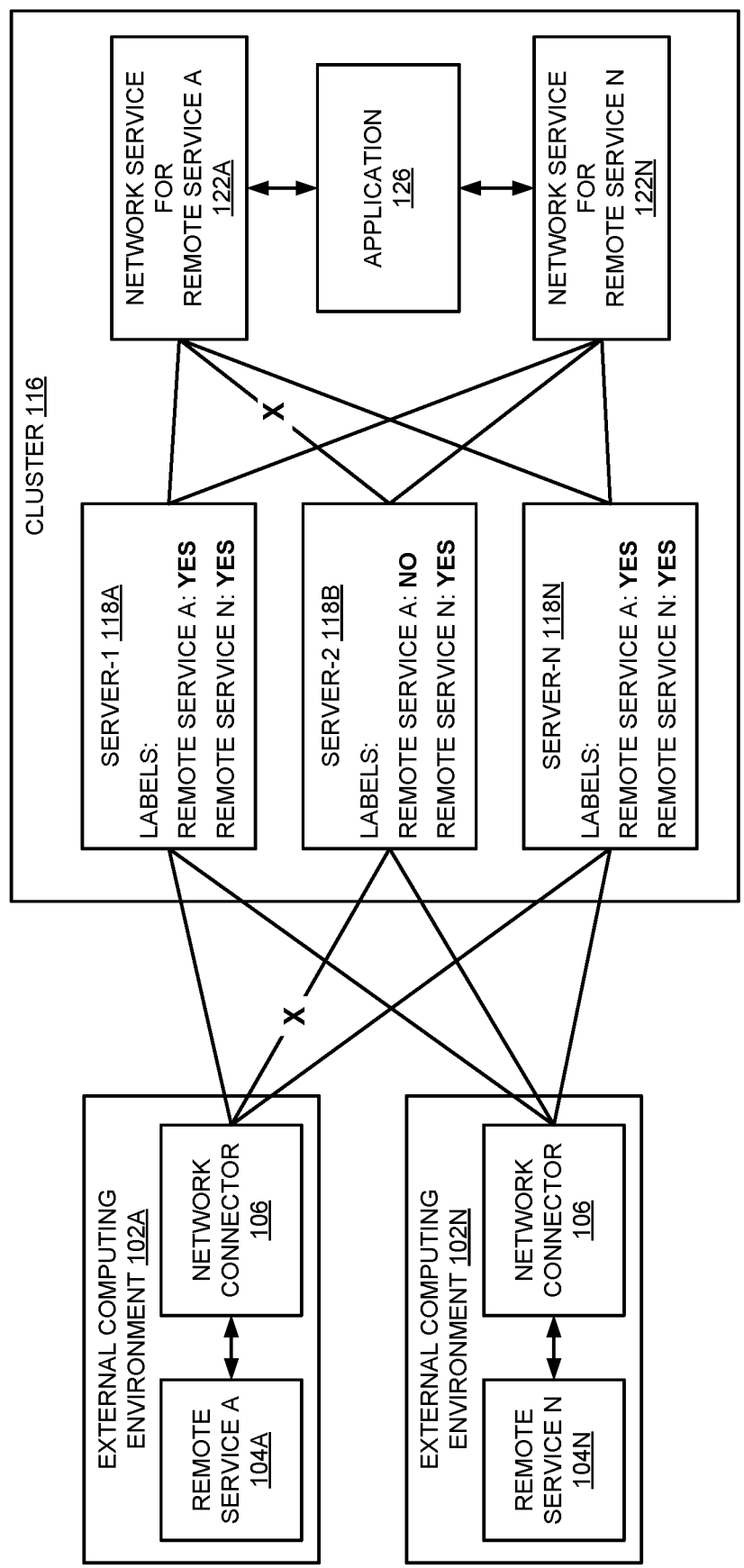
FIG. 3 is a block diagram that illustrates assigning example ready status labels to servers, in accordance with some embodiments of the present disclosure.

In some embodiments, as illustrated in FIG. 3, a label for each remote service 104 exposed by a server 118A, 118B, 118N can be assigned to the server 118A, 118B, 118N to indicate the readiness of the server 118A, 118B, 118N to provide network connections to the remote service 104. The labels can be attributes of the servers 118A, 118B, 118N. In the context of the Kubernetes® container orchestration system, the labels can comprise key/value pairs that are attached to the servers 118A, 118B, 118N (which can be implemented as pods). In response to receiving status reports from a respective connection monitor 136, the status manager 132 can update a server's labels to indicate the server's ability to provide network connections to the remote services 104. FIG. 3 provides an illustrative example of assigning labels to the servers 118. As shown, the servers 118 can be assigned the labels "Remote Service A" and "Remote Service N" and an indication of "Yes" or "No" to show the servers' readiness to provide network connections to the remote services 104.

The labels assigned to the servers 118 enable the network services 122A, 122N to route connection requests to servers 118 that are able to fulfill the connection requests. For example, as illustrated in FIG. 3, the network services 122A, 122N receive requests from an application 126 to connect to the remote services 104, where network service 122A handles connection requests for remote service 104A

"Remote Service A", and network service 122N handles connection requests for remote service 104N "Remote Service N. In response to receiving a request to connect to "Remote Service A", the network service 122A identifies the servers 118 that are ready to provide network connections to "Remote Service A" via labels that indicate that the servers 118 are ready. For example, as illustrated in FIG. 3, the labels assigned to "Server-1" and "Server-N" indicate the readiness of "Server-1" and "Server-N" to provide network connections to "Remote Service A". However, the label assigned to "Server-2" indicates that "Server-2" is not ready to provide network connections to "Remote Service A". Therefore, based on the statuses indicated by the labels, network service 122A routes the request to connect to "Remote Service A" to either "Server-1" or "Server-N". Illustratively, a selection between "Server-1" and "Server-N" can be made using a load balancing technique.

Figure 6:
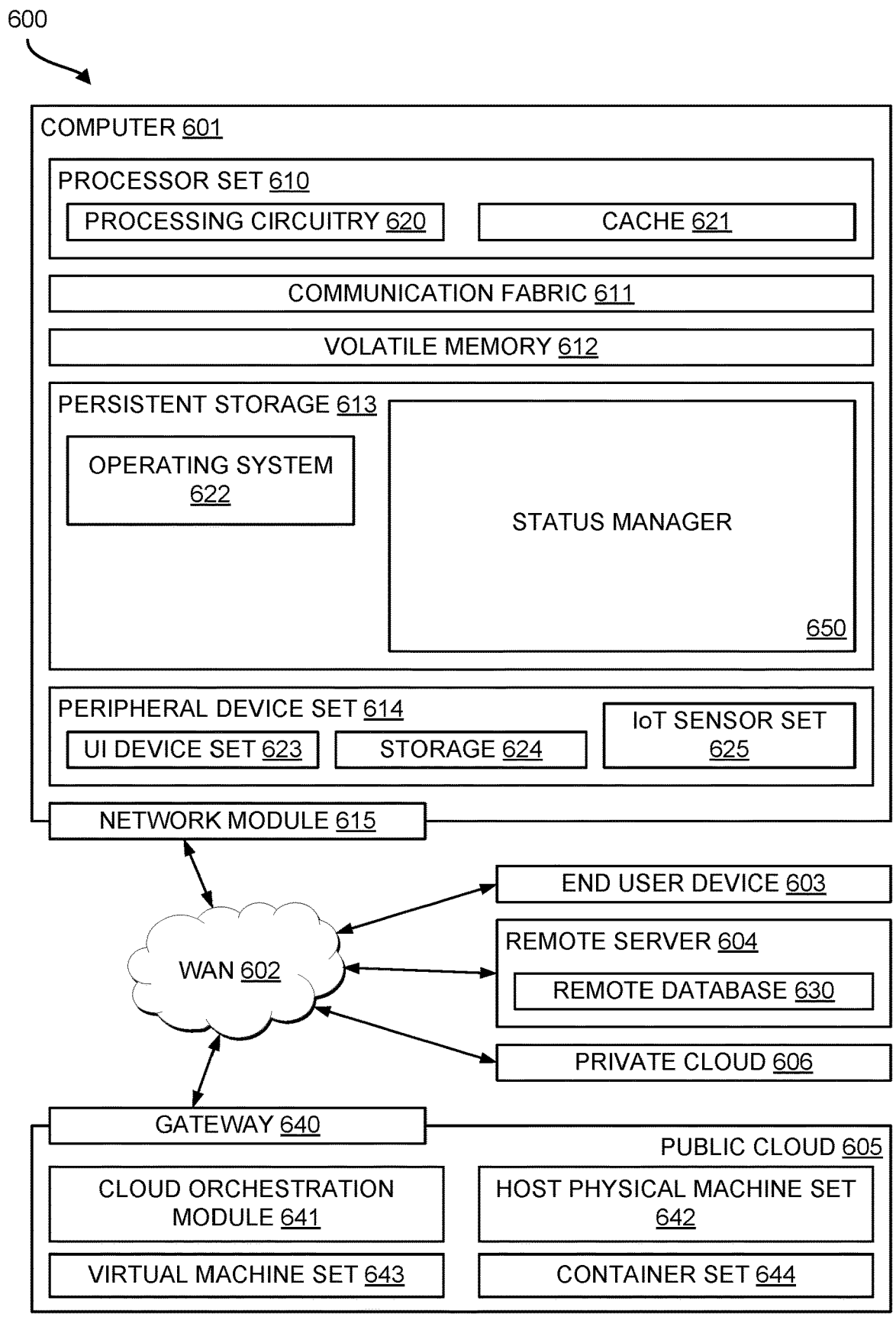
FIG. 6 is a block diagram that illustrates an example computing environment in which aspects of the present disclosure can be implemented, in accordance with some embodiments of the present disclosure.

All or a portion of the components shown in the preceding figures can be implemented, for example by all or a subset of the computing environment 600 of FIG. 6. API calls, procedure calls, or other network commands that may be made in relation to the components, modules, and/or services may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

A network (not shown) can be provided to enable communication between the components of the computational environment 100. The network can include any useful computing network, including an intranet, the Internet, a local area network, a wide area network (e.g., 602 of FIG. 6), a wireless data network, or any other such network or combination thereof. Components utilized for the network can depend at least in part upon the type of network and/or environment selected. Communication over the network can be enabled by wired or wireless connections and combinations thereof.

Generally, the components shown in the figures and described above can be implemented as modules (also referred to as program modules). The modules can include routines, programs, components and/or data structures that perform particular tasks and/or implement particular abstract data types. In some embodiments, the modules can be implemented as computing services. For example, a module can be considered a service with one or more processes executing on a server or other computer hardware. Such services can provide a service application that receives requests and provides output to other services or consumer devices. An API can be provided for each service to enable a first service to send requests to and receive output from a second service. Such APIs can also allow third parties to interface with the services and make requests and receive output from the services.

As used herein, the terms "component", "system", and/or "interface" can refer to and/or can include a computer-related entity or an entity related to an operational machine with one or more specific functionalities. The entities described herein can be either hardware, a combination of hardware and software, software, or software in execution. By way of illustration, both an application executing on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes, such as in accordance with a signal having one or more data packets (e.g., data from one component interacting with another component in a local system, distributed system and/or across a computer network). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In some aspects, a component can emulate an electronic component via a virtual machine (e.g., within clouds 606 or 605 in FIG. 6).

In the illustrative examples above, the same reference numeral may be used in more than one figure. The reuse of a reference numeral in different figures represents the same element in the different figures. While the figures illustrate an example of a computational environment that can implement the techniques above, many other similar or different environments are possible. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

FIG. 4 is a flow diagram illustrating an example method 400 for determining the readiness of a server to provide connections to remote services exposed by the server, and assigning ready statuses to the server to indicate the server's readiness to provide network connections to the remote services, in accordance with some embodiments of the present disclosure. As described earlier, an application hosted on a cluster of nodes can be configured to access remote services that are hosed outside of the cluster. The remote services can include, but are not limited to, databases, event-streaming services, message queues, caching servers, AI models, as well as other types of remote services hosted in external computing environments (e.g., an enterprise network, a private cloud, a public cloud, etc.) that are outside of the cluster that hosts the application.

A container orchestration system can abstract access to the remote services using one or more servers that expose the remote services to the application. In some embodiments, the server(s) can be implemented using a pod, which can be hosted on the cluster containing the application and can be managed by the container orchestration system. The server(s) establish network connections to the remote services via service mappings that route requests and responses between the remote services and the application.

Because the server(s) provide network connections to multiple remote services, the method 400 assigns individual ready statuses to the server(s) to accurately represent the readiness of the server(s) to connect to each of the remote services. More specifically, in operation 402, the method 400 monitors network connectivity between a server and the remote services exposed by the server to the application. In some embodiments, the monitoring of the network connectivity between the server and the remote services can be performed by a connection monitor that recurrently or periodically tests the network connections between the server and the remote services and provides the results of the tests to the method 400. The connection monitor, in some embodiments, can be implemented using a sidecar container that is deployed to a pod to execute alongside the server. Illustratively, the connection monitor can be configured to execute a script that tests access to a remote service by, for example, calling the remote service's API, creating a TCP socket connection to the remote service, determining whether a network connection file for the remote service exists, or by performing another technique to determine network connectivity for the remote service.

In operation 404, for each of the remote services exposed by the server, the method 400 assigns to the server a ready status that indicates a readiness of the server to provide a network connection between the application and a remote service based on the network connectivity tested above. In some embodiments, a ready status of the server to provide a network connection to a remote service can be provided using a label. The label can be an attribute of the server. In the context of the Kubernetes® container orchestration system, the label can comprise a key/value pair that is attached to the server (which can be implemented as a pod). Accordingly, the method 400 can assign the server a label for each remote service that the server exposes, such that, for example, the server can be assigned a first label to indicate the server's readiness to provide network connections to a first remote service, and the server can be assigned a second label to indicate the server's readiness to provide network connections to a second remote service.

Figure 5:
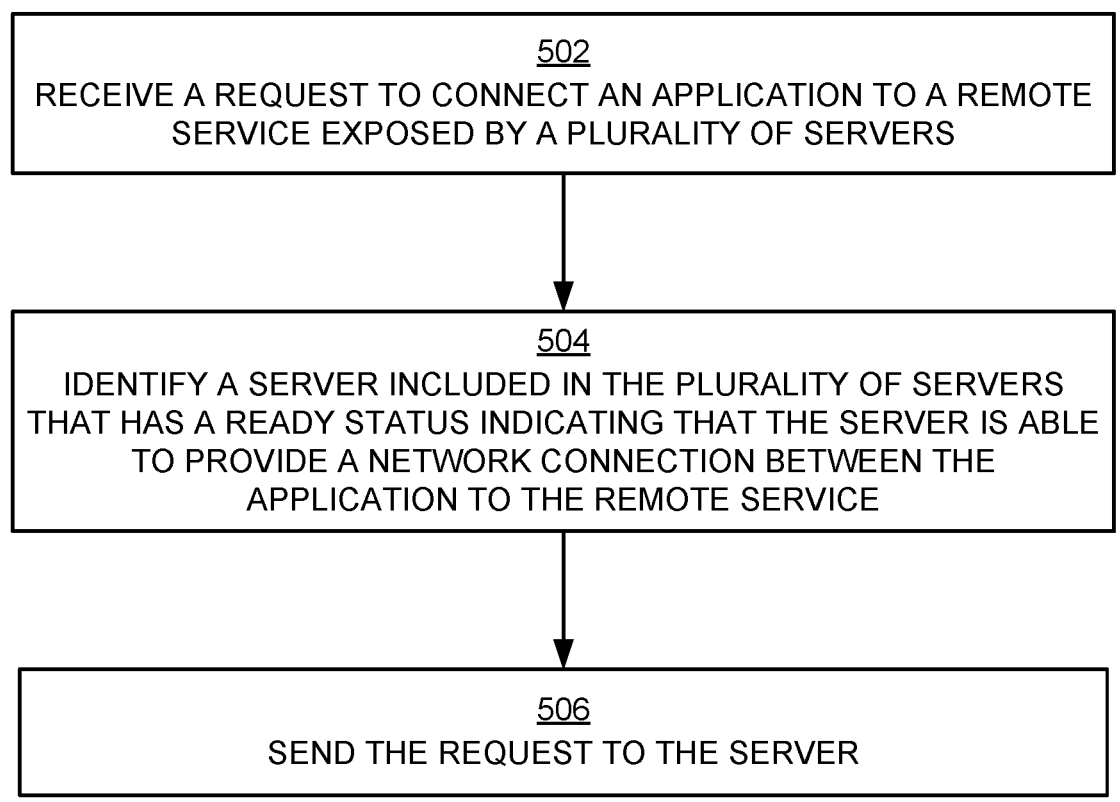
FIG. 5 is a flow diagram illustrating an example method for connecting an application to a remote service, in accordance with some embodiments of the present disclosure.

FIG. 5 is a flow diagram illustrating an example method 500 for connecting an application to a remote service, in accordance with some embodiments of the present disclosure. Starting in operation 502, the method 500 receives a request to connect an application to a remote service. As described earlier in association with FIG. 4, a container orchestration system can abstract access to remote services using servers that expose the remote services to the application. The servers can be assigned ready statuses to accurately represent the readiness of the servers to provide the network connections between the remote services and the application, and the method 500 can utilize the ready statues of the servers to facilitate routing connection requests to servers that are able to fulfill the connection requests.

More specifically, the method 500 in operation 504 identifies a server included in the plurality of servers that has a ready status indicating that the server is able to provide a network connection between the application to the remote service. In some embodiments, the ready statuses of the servers can be provided using labels assigned to the servers, where a label assigned to a server can indicate, for example, that the server is ready to provide network connections to the remote service, or that the server is unable to establish network connections to the remote service.

The method 500 can evaluate the labels assigned to the servers to identify one or more servers that are able to provide network connections to the remote service, and the method 500 can select one of the servers. In operation 506, the method 500 sends the request to the server selected to provide the network connection between the application and the remote service.

The methods 400 and 500 described above can be performed by a computer (e.g., computer 601 in FIG. 6), performed in a cloud computing environment (e.g., clouds 606 or 605 in FIG. 6), and/or generally can be implemented in fixed-functionality hardware, configurable logic, logic instructions, etc., or any combination thereof.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 600 contains an example of an environment for the execution of at least some of the computer code involved in performing the disclosed methods, such as computer code in block 650 for the status manager described earlier that determines the readiness of a server to provide connections to remote services exposed by the server, and assigns a readiness status to the server for each of the remote service exposed by the server. In addition to block 650, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 650, as identified above), peripheral device set 614 (including user interface (UI), device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the disclosed methods"). These computer readable program instructions are stored in various types of computer readable storage media, such as cache 621 and the other storage media discussed below. The computer readable program instructions, and associated data, are accessed by processor set 610 to control and direct performance of the disclosed methods. In computing environment 600, at least some of the instructions for performing the disclosed methods may be stored in block 650 in persistent storage 613.

COMMUNICATION FABRIC 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid-state storage devices. Operating system 622 may take several forms, such as various known proprietary operating systems or open-source Portable Operating System Interface type operating systems that employ a kernel. The code included in block 650 typically includes at least some of the computer code involved in performing the disclosed methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the disclosed methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. The terms "comprises," "comprising," "includes," "including," "has," "having," "contains" or "containing," or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. The term "user" refers to an entity (e.g., an individual(s), a computer, or an application executing on a computer). It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof.

In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure. Note further that numerous aspects or features are disclosed herein, and unless inconsistent, each disclosed aspect or feature is combinable with any other disclosed aspect or feature as desired for a particular application of the concepts disclosed.

As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art. Any advantages discussed in the present disclosure are example advantages, and embodiments of the present disclosure can exist that realize all, some, or none of any of the discussed advantages while remaining within the spirit and scope of the present disclosure.

It will be further appreciated that various aspects of the present invention may be provided in the form of a service deployed on behalf of a customer to offer service on demand.

The descriptions of the various aspects of the present invention have been presented for purposes of illustration, but are not intended to be exhaustive or limited to the approaches disclosed. Many modifications and variations will be apparent to those of ordinary skill in the art without departing from the scope and spirit of the described aspects. The terminology used herein was chosen to best explain the principles of the various aspects described, the practical application or technical improvement over technologies found in the marketplace, or to enable others of ordinary skill in the art to understand the approaches disclosed herein.

What is claimed is:

1. A system comprising:
one or more computer readable storage media storing program instructions and one or more processors which, in response to executing the program instructions, are configured to:
monitor network connectivity between a first server and a plurality of remote services, wherein the first server is one of a plurality of servers that expose the plurality of remote services to at least one application, and the plurality of servers and the at least one application are hosted on a cluster of nodes managed by a container orchestration system,
wherein a network service provided by the container orchestration system is callable by the at least one application, and the network service routes a network connection between the at least one application and a remote service of the plurality of remote services through any one of the plurality of servers having a ready status indicating an ability to provide the network connection to the remote service,
wherein each server of the plurality of servers is assigned a ready status for each remote service network connection exposed by the server, where a ready status for a remote service network connection indicates a readiness of the server to provide a network connection to the remote service through the server, and ready statuses assigned to the plurality of servers enables the network service to identify a particular server that is able to provide the network connection to the remote service and route a network connection to the remote service through the particular server;
assign to the first server, based on the network connectivity between the first server and a first remote service in the plurality of remote services, a first ready status to indicate a readiness of the first server to provide network connections between the first remote service and the at least one application; and
assign to the first server, based on the network connectivity between the first server and a second remote service in the plurality of remote services, a second ready status to indicate a readiness of the first server to provide network connections between the second remote service and the at least one application.

2. The system of claim 1, wherein the first server is implemented using a pod of one or more containerized applications, and wherein the pod includes a sidecar container that tests the network connectivity between the first server and the plurality of remote services.

3. The system of claim 2, wherein the program instructions are further configured to cause the one or more processors to:
recurrently receive indications of the network connectivity between the first server and the plurality of remote services from the sidecar container.

4. The system of claim 1, wherein the program instructions configured to cause the one or more processors to assign ready statuses are further configured to cause the one or more processors to:
assign labels to the first server to indicate the readiness of the first server to provide the network connections between the first and second remote services and the at least one application.

5. The system of claim 1, wherein the cluster includes the plurality of servers that expose the plurality of remote services to the at least one application.

6. The system of claim 1, wherein the program instructions are further configured to cause the one or more processors to:
receive a request for a network connection between the at least one application and a remote service included in the plurality of remote services;
identify the first server as having a ready status indicating that the first server is able to provide the network connection to the remote service; and
send the request for the network connection to the first server.

7. The system of claim 6, wherein the network connection provided by the first server is a secure tunnel connection.

8. A computer-implemented method comprising:
monitoring network connectivity between a first server and a plurality of remote services, wherein the first server is one of a plurality of servers that expose the plurality of remote services to at least one application, and the plurality of servers and the at least one application are hosted on a cluster of nodes managed by a container orchestration system,
wherein a network service provided by the container orchestration system is callable by the at least one application, and the network service routes a network connection between the at least one application and a remote service of the plurality of remote services through any one of the plurality of servers having a ready status indicating an ability to provide the network connection to the remote service,
wherein each server of the plurality of servers is assigned a ready status for each remote service network connection exposed by the server, where a ready status for a remote service network connection indicates a readiness of the server to provide a network connection to the remote service through the server, and ready statuses assigned to the plurality of servers enables the network service to identify a particular server that is able to provide the network connection to the remote service and route a network connection to the remote service through the particular server;
assigning to the first server, based on the network connectivity between the first server and a first remote service in the plurality of remote services, a first ready status to indicate a readiness of the first server to provide network connections between the first remote service and the at least one application; and
assigning to the first server, based on the network connectivity between the first server and a second remote service in the plurality of remote services, a second ready status to indicate a readiness of the first server to provide network connections between the second remote service and the at least one application.

9. The computer-implemented method of claim 8, wherein the first server is implemented using a pod of one or more containerized applications, and wherein the pod includes a sidecar container that tests the network connectivity between the plurality of remote services and the first server.

10. The computer-implemented method of claim 9, further comprising periodically receiving indications of the network connectivity between the first server and the plurality of remote services from the sidecar container.

11. The computer-implemented method of claim 8, wherein assigning the first server the ready status further comprises:
assigning assign labels to the first server to indicate the readiness of the first server to provide the network connections between the first and second remote services and the at least one application.

12. The computer-implemented method of claim 8, wherein the cluster includes the plurality of servers that expose the plurality of remote services to the at least one application.

13. The computer-implemented method of claim 8, further comprising:
receiving a request for a network connection between the at least one application and a remote service included in the plurality of remote services;
identifying the first server as having a ready status indicating that the first server is able to provide the network connection to the remote service; and
sending the request for the network connection to the first server.

14. A computer program product comprising:
one or more computer readable storage media, and program instructions collectively stored on the one or more computer readable storage media, the program instructions configured to cause one or more processors to:
monitor network connectivity between a first server and a plurality of remote services, wherein the first server is one of a plurality of servers that expose the plurality of remote services to at least one application, and the plurality of servers and the at least one application are hosted on a cluster of nodes managed by a container orchestration system,
wherein a network service provided by the container orchestration system is callable by the at least one application, and the network service routes a network connection between the at least one application and a remote service of the plurality of remote services through any one of the plurality of servers having a ready status indicating an ability to provide the network connection to the remote service,
wherein each server of the plurality of servers is assigned a ready status for each remote service network connection exposed by the server, where a ready status for a remote service network connection indicates a readiness of the server to provide a network connection to the remote service through the server, and ready statuses assigned to the plurality of servers enables the network service to identify a particular server that is able to provide the network connection to the remote service and route a network connection to the remote service through the particular server;
assign to the first server, based on the network connectivity between the first server and a first remote service in the plurality of remote services, a first ready status to indicate a readiness of the first server to provide network connections between the first remote service and the at least one application; and
assign to the first server, based on the network connectivity between the first server and a second remote service in the plurality of remote services, a second ready status to indicate a readiness of the first server to provide network connections between the second remote service and the at least one application.

15. The computer program product of claim 14, wherein the first server is implemented using a pod of one or more containerized applications, and wherein the pod includes a sidecar container that tests the network connectivity between the first server and the plurality of remote services.

16. The computer program product of claim 15, wherein the program instructions are further configured to cause the one or more processors to:
   recurrently receive indications of the network connectivity between the first server and the plurality of remote services from the sidecar container.

17. The computer program product of claim 14, wherein the program instructions configured to cause the one or more processors to assign ready statuses are further configured to cause the one or more processors to:
   assign labels to the first server to indicate the readiness of the first server to provide the network connections between the first and second remote services and the at least one application.

18. The computer program product of claim 14, wherein the cluster includes the plurality of servers that expose the plurality of remote services to the at least one application.

19. The computer program product of claim 18, wherein the program instructions are further configured to cause the one or more processors to:
   receive a request for a network connection between the at least one application and a remote service included in the plurality of remote services;
   identify the first server as having a ready status indicating that the first server is able to provide the network connection to the remote service; and
   send the request for the network connection to the first server.

20. The computer program product of claim 19, wherein the network connection provided by the first server is a secure tunnel connection.

\* \* \* \* \*